UNITED STATES PATENT OFFICE.

VIRGINIA B. BRIGHT, OF FAYETTEVILLE, TENNESSEE.

BREAKFAST-FOOD COMPOUND.

1,175,407.  Specification of Letters Patent.  Patented Mar. 14, 1916.

No Drawing.  Application filed August 25, 1914.  Serial No. 858,509.

*To all whom it may concern:*

Be it known that I, VIRGINIA B. BRIGHT, a citizen of the United States, residing at Fayetteville, in the county of Lincoln and State of Tennessee, have invented certain new and useful Improvements in Breakfast-Food Compounds; and I do hereby declare the following to be a full, clear, and exact description of the invention, such as will enable others skilled in the art to which it appertains to make and use the same.

This invention has for its object the providing of a new, wholesome, palatable and inexpensive breakfast food for mankind, consisting largely of wheat bran.

As wheat bran has been proved, scientifically and by practical tests, to be a most valuable and healthful food for mankind—being rich in certain minerals of high food values: and also as it has been demonstrated by actual tests that wheat bran is an excellent, but non-injurious laxative, being held by some of the most eminent physicians as one of the very best of all known laxatives—from its peculiar formation and what might be termed its mechanical action on the lining of the intestines, rather than from any medicinal qualities: and as it has heretofore appeared to be practically impossible to sterilize and preserve wheat bran without losing, or neutralizing to a large extent, its virtues as a nutritive and its laxative qualities as well: and as plain, or raw wheat bran is most unpalatable to most people:—in view of all of which—one of the principal objects of this invention is to sterilize and preserve and render palatable a specific quantity of wheat bran in a compound of other ingredients used for the purpose of preserving and rendering palatable the compound for a human food.

In the process of manufacturing the food compound the following ingredients are used in the proportions stated, viz:

|       | Measure. | Weight. |
|-------|----------|---------|
| Bran  | 1¼ pints. | 4 ounces. |
| Sugar | ⅝ " | 10 " |
| Honey | ⅛ " | 3½ " |
| Water | ⅛ " | 2½ " |

The sugar, honey, and water, in the proportions above stated, are placed in a vessel together and boiled until, when allowed to drip from a spoon, the syrup, or candy, spins down like a brittle hair; when it has reached that stage, the vessel containing the boiling syrup, or candy, is immediately removed from the fire and the specified quantity of bran is quickly added, a little at a time, and briskly stirred, into the hot liquid, while it is still at the boiling point, and the whole is rapidly stirred until practically every particle of the bran has been incorporated in, or coated over with a honey-sugar candy; the stirring process is continued till the compound breaks up into granules of, from the size of a millet seed up to the size of a peanut kernel. The intense heat of the practically boiling syrup, or candy, is sufficient to kill all germs in the bran and, as each particle of it is quickly sealed within the coating of the honey-sugar candy none of its valuable food properties are lost, nor are any of the qualities that render bran an ideal laxative destroyed, as is the case when any form of ordinary cooking is attempted.

If desired, after the candy stage has been reached as above explained, the boiling process may be continued till the syrup slightly thickens—and small quantities of it, when dropped into cold water, will instantly harden. When that stage is reached the specified quantity of bran is added, a little at a time and briskly stirred just as before, but, instead of breaking up into granules by continued stirring as before, the additional cooking of the syrup, or candy, owing to the presence of honey in it, causes the compound, after the bran has been stirred into it, to remain, while still hot, a pliant mass. It may then, before it cools, be molded or compressed, or rolled out and cut into any desired shape—or, after it cools and hardens, the compound may be crushed into granules of suitable sizes for a breakfast food.

In the process of preparing this food compound, each particle of bran, though not cooked, is incased in a coating of crystallized honey-sugar candy hermetically sealing it and preserving it indefinitely. The honey used not only adds nutrition to the compound, but assists in preserving the food as well as giving it a fresh and desirable flavor. However, the food may be made without the use of honey if desired, as the sugar-candy formed by boiling sugar alone (with water) in the manner above stated, will coat over and preserve bran, when incorporated in it, in the same manner as in the honey-sugar candy, as above explained, and will also render the compound palatable.

It will thus be seen that I have taken three (or two) distinct food units and combine them in such a way as to create an absolutely new food compound, with self contained elements of preservation.

I claim:—

1. The here-in described food compound containing wheat bran incorporated in, or covered over with a coating of crystallized honey-sugar candy and formed into any desired shape—substantially as described and for the purposes specified.

2. The here-in described food compound containing the aforesaid ingredients in the following proportions, to wit:—four ounces of wheat bran incorporated in, or coated with, a honey-sugar candy formed by boiling ten ounces of sugar with three and one half ounces of honey in two and one half ounces of water, substantially as described and for the purposes specified.

In testimony whereof I affix my signature in presence of two witnesses.

VIRGINIA B. BRIGHT.

Witnesses:
T. O. BAGLEY,
M. M. BRIGHT.